(12) United States Patent
Zhang et al.

(10) Patent No.: US 10,547,808 B2
(45) Date of Patent: *Jan. 28, 2020

(54) TV SET BASE WITH A SUPPORTING AND A RETRACTED STATE

(71) Applicants: HISENSE HIVIEW TECH CO., LTD., Qingdao, Shandong (CN); HISENSE USA CORPORATION, Suwanee, GA (US)

(72) Inventors: Xuan Wei Zhang, Shandong (CN); Bin Xu, Shandong (CN); Di Fei Wang, Shandong (CN)

(73) Assignees: QINGDAO HISENSE ELECTRONICS CO., LTD., Qingdao, Shandong (CN); HISENSE USA CORPORATION, Suwanee, GA (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/798,638

(22) Filed: Oct. 31, 2017

(65) Prior Publication Data
US 2018/0054588 A1  Feb. 22, 2018

Related U.S. Application Data

(63) Continuation of application No. 14/243,467, filed on Apr. 2, 2014, now Pat. No. 9,832,415.

(30) Foreign Application Priority Data

Sep. 25, 2013 (CN) ..................... 2013 2 0594287 U
Dec. 6, 2013 (CN) .......................... 2013 1 0653488

(51) Int. Cl.
| | | |
|---|---|---|
| H04N 5/64 | (2006.01) |
| F16M 11/10 | (2006.01) |
| F16M 11/20 | (2006.01) |
| F16M 11/38 | (2006.01) |
| F16M 13/02 | (2006.01) |
| F16M 11/00 | (2006.01) |

(52) U.S. Cl.
CPC ............... *H04N 5/64* (2013.01); *F16M 11/00* (2013.01); *F16M 11/10* (2013.01); *F16M 11/2021* (2013.01); *F16M 11/38* (2013.01); *F16M 13/02* (2013.01); *F16M 2200/08* (2013.01)

(58) Field of Classification Search
CPC ....................................................... H04N 5/64
See application file for complete search history.

*Primary Examiner* — Y Lee
(74) *Attorney, Agent, or Firm* — Tim Tingkang Xia, Esq.; Locke Lord LLP

(57) ABSTRACT

In one aspect, a TV set is provided. A base includes a first member and a second member that have two supporting arms symmetrically disposed on two sides of the first member. One end of each of the two supporting arms is respectively rotatably connected with two side portions of the first member. When the base is in a supporting state, a first angle, a second angle and a third angle is formed between the first member and the display screen assembly, between the first and second members, and between the second member and a supporting object, respectively. When the base is in a retracted state, the first member is substantially parallel to the display screen assembly and is located at a lower portion of the display screen assembly, and the second member is located on a same side of the first member and the display screen assembly.

16 Claims, 12 Drawing Sheets

TV SET BASE WITH A SUPPORTING AND A RETRACTED STATE

CROSS-REFERENCE TO RELATED APPLICATION

This non-provisional application is a continuation application of U.S. application Ser. No. 14/243,467, filed Apr. 2, 2014, which itself claims the priority to and the benefit of, under 35 U.S.C. § 119(a), Chinese Patent Application No. 201320594287.6, filed on Sep. 25, 2013 and Chinese Patent Application No. 201310653488.3, filed on Dec. 6, 2013, in the State Intellectual Property Office of P.R. China. The entire contents of the above identified applications are incorporated herein by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to electronic product technology, and more particularly to a TV set.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing TV set (e.g., a flat-panel TV set) may be stably supported on a supporting object, which may be table top (e.g., a TV cabinet table top), through a base mounted at a lower portion of the TV set. When the TV set is required to be hung on a wall, the base needs to be removed aside. The base of the TV set is only a stressed component, which only plays a role of supporting a display screen assembly of the TV set. In actual implementations, when the TV set is supported on a table top or hung on a wall, the base needs to be mounted on or removed from the TV set. The mounting and removal procedures of the base are time-consuming and laborious, and the base is prone to be damaged.

Further, in the existing TV set, the display screen assembly becomes thinner, and components such as a speaker assembly, a circuit module and a terminal are mounted on the display screen assembly. A loudspeaker of the speaker assembly is designed in a manner of generating sound backwards or downwards, which leads to certain requirements for the thickness of the display screen assembly. Further, the directivity of the sound becomes stronger when the frequency of the sound becomes higher. The backward or downward generating manner of sound may cause reduction of mid-range and treble sounds received directly in front of the TV set, resulting in dry sounds and poor sound quality.

Therefore, a heretofore unaddressed need exists in the art to address the aforementioned deficiencies and inadequacies.

SUMMARY OF THE INVENTION

Aspects of the present invention direct to a TV set, which intends to solve the technical deficiencies that a base of the existing TV set needs to be mounted and removed, which is time-consuming and laborious, and the base is prone to be damaged.

One aspect of the present invention relates to a TV set, which includes a display screen assembly and a base disposed at a lower portion of the display screen assembly. The base includes at least one first member and a second member. The at least one first member includes a first end and a supporting end, where the first end of the at least one first member is rotatably connected with a back side of the display screen assembly. The second member includes a connecting end and a supporting end, wherein the connecting end of the second member is rotatably connected with the at least one first member at a rotatory connection point away from the first end of the at least one first member. When the base is in a supporting state, a first fixed angle is formed between the at least one first member and the display screen assembly, a second fixed angle is formed between the at least one first member and the second member at the rotatory connection point, the supporting end of the at least one first member is configured to be positioned at a lower back of the display screen assembly on a supporting object, and the supporting end of the second member is configured to be positioned at a lower front of the display screen assembly on the supporting object, such that a triangular supporting structure is formed by the rotatory connection point rotatably connected with the at least one first member, the supporting end of the at least one first member, and the supporting end of the second member, and a vertical projection of the display screen assembly onto a plane defined by the supporting end of the at least one first member and the supporting end of the second member is located between the supporting end of the at least one first member and the supporting end of the second member. When the base is in a retracted state, the at least one first member moves to a position substantially close to the back side of the display screen assembly, and the second member is substantially parallel to the display screen assembly.

In certain embodiments, when the base is in the retracted state, a line formed between the first end of the at least one first member and the supporting end of the at least one first member is substantially parallel to the display screen assembly.

In certain embodiments, when the base is in the retracted state, the second member is substantially parallel to the display screen assembly.

In certain embodiments, the TV set further includes a speaker assembly disposed on the base, where the speaker assembly is configured to generate sound towards a front side of the TV set. In one embodiment, the speaker assembly is disposed on the at least one first member.

In certain embodiments, a first limiting mechanism is provided at the connecting end of the second member, such that when the base is in the supporting state, the first limiting mechanism locks the second member relatively to the at least one first member to form the second fixed angle between the at least one first member and the second member at the rotatory connection point.

In certain embodiments, a second limiting mechanism is provided at the first end of the at least one first member, such that when the base is in the supporting state, the second limiting mechanism locks the at least one first member relatively to the display screen assembly to form the first fixed angle between the at least one first member and the display screen assembly.

Compared with the conventional technology, adjustment of the base saves time and effort, and the base is not easily damaged, thereby improving the quality of the TV set. Moreover, when the base of the TV set is in the retracted state, the second supporting mount is superimposed on the outer side wall of the first supporting mount, and in the thickness direction of the TV set, a two-layer structure of the display screen assembly and the first supporting mount is formed, thus achieving a thinner structure of the TV set in the hung state when the base is retracted.

These and other aspects of the invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE INVENTION

Figure 1:
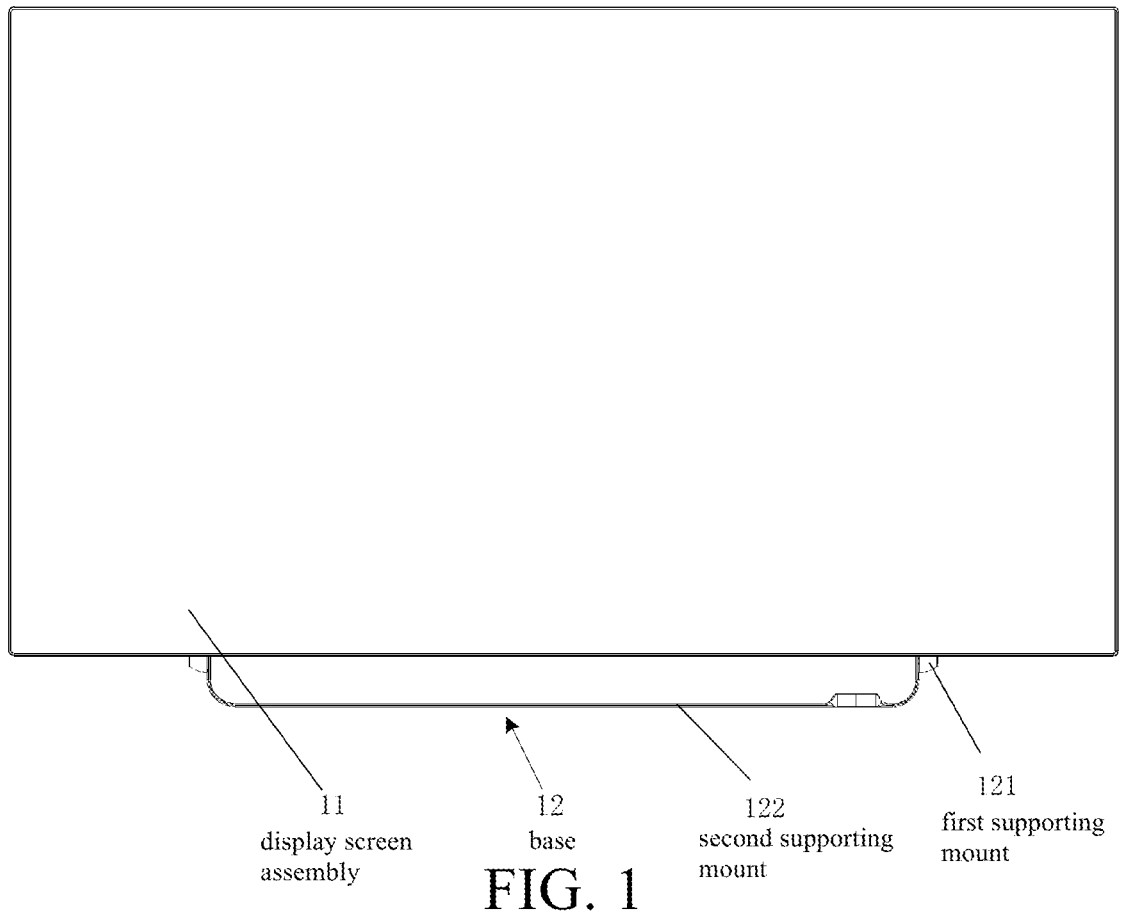
FIG. 1 is a schematic front view of the structure of a TV set according to one embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

As used herein, the term "unit", "module" or "submodule" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term unit, module or submodule may include memory (shared, dedicated, or group) that stores code executed by the processor.

The description will be made as to the embodiments of the invention in conjunction with the accompanying drawings in FIGS. 1-16. It should be understood that specific embodiments described herein are merely used for explaining the invention, but are not intended to limit the invention. In accordance with the purposes of this disclosure, as embodied and broadly described herein, this invention, in one aspect, relates to a TV set.

Figure 2:
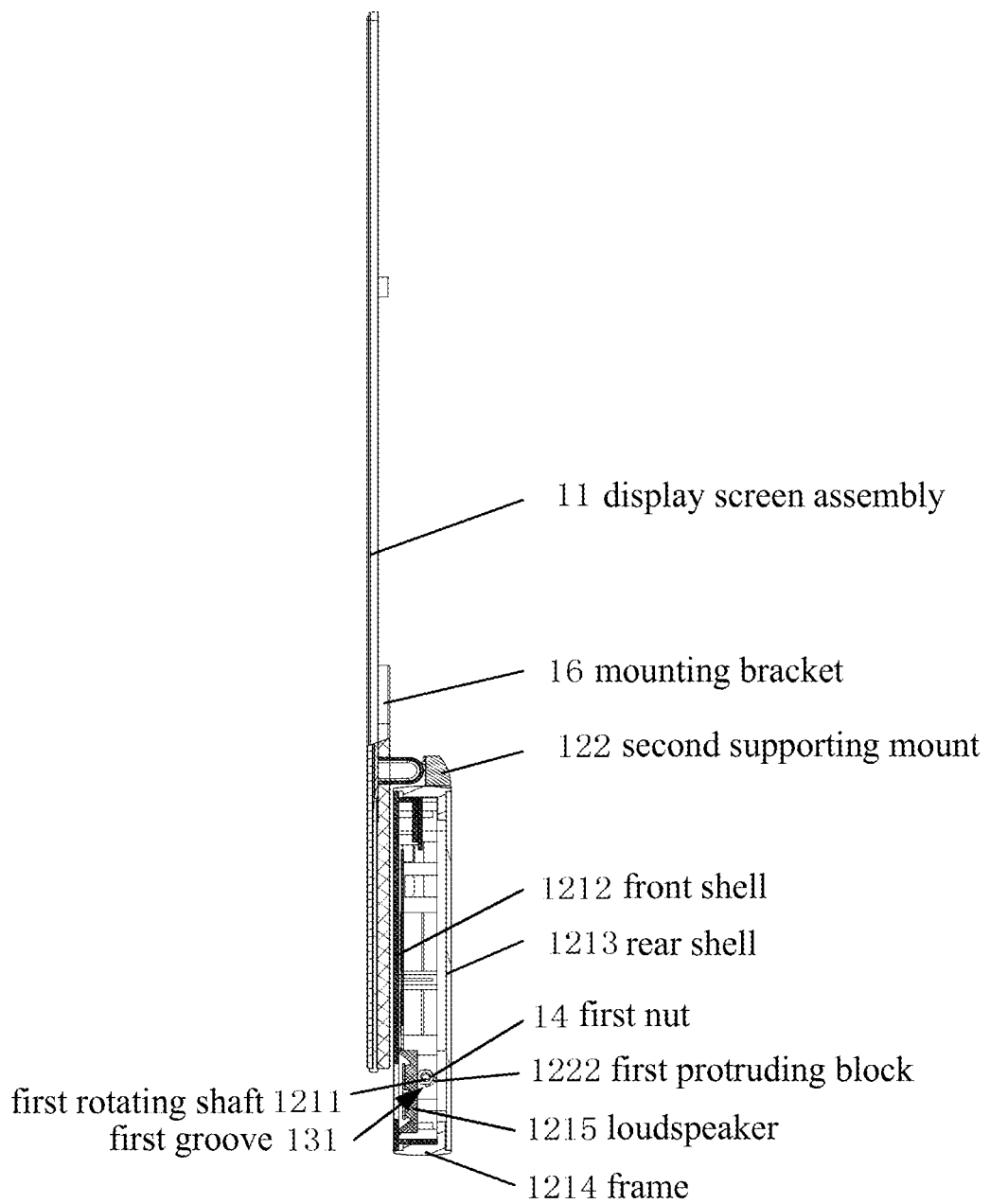
FIG. 2 is a schematic cross-sectional right view of a partial structure of the TV set as shown in FIG. 1 when a base is in a retracted state according to one embodiment of the present invention.
Figure 3:
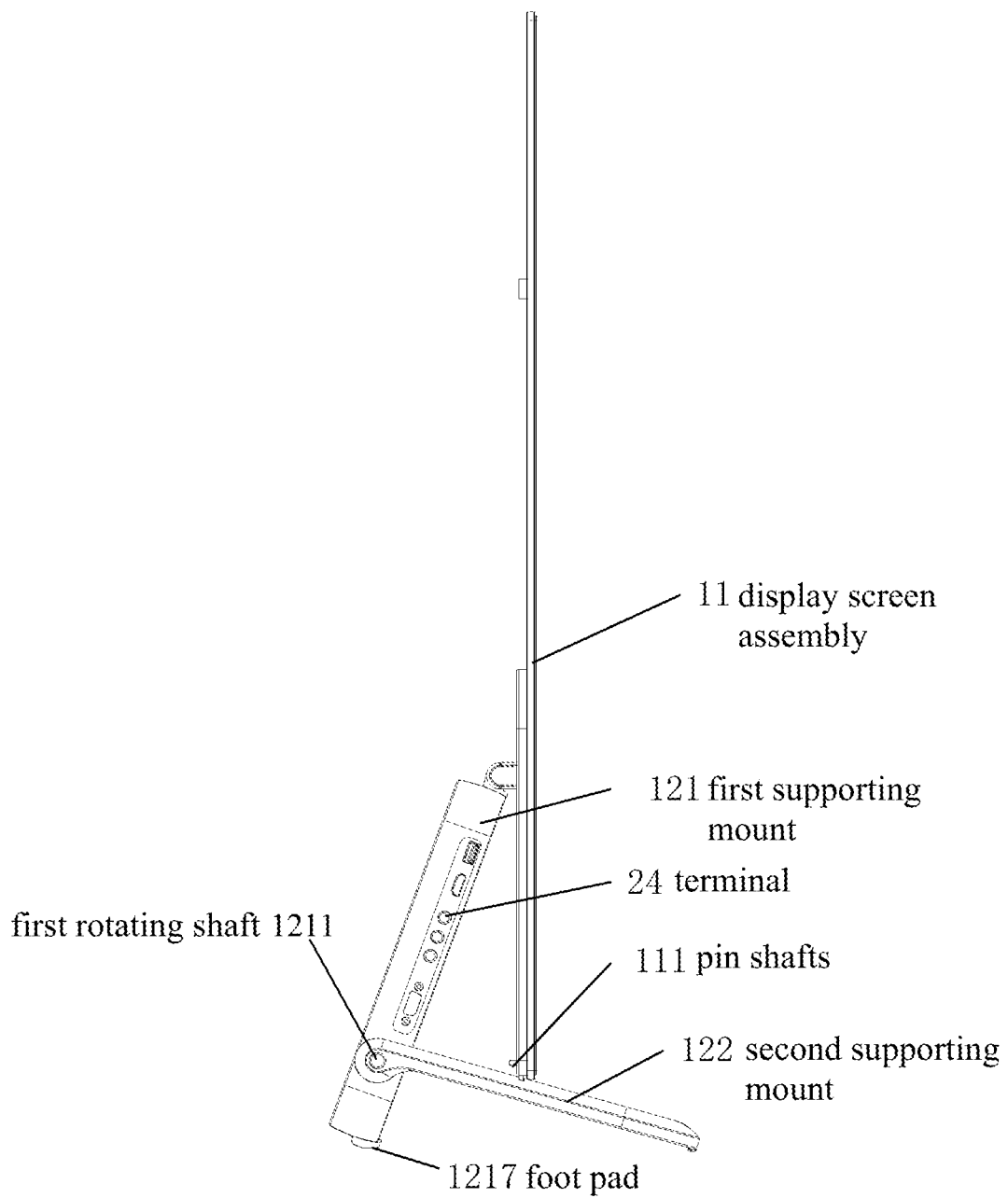
FIG. 3 is a schematic left view of the structure of the TV set as shown in FIG. 1 when the base is in a supporting state according to one embodiment of the present invention.
Figure 4:
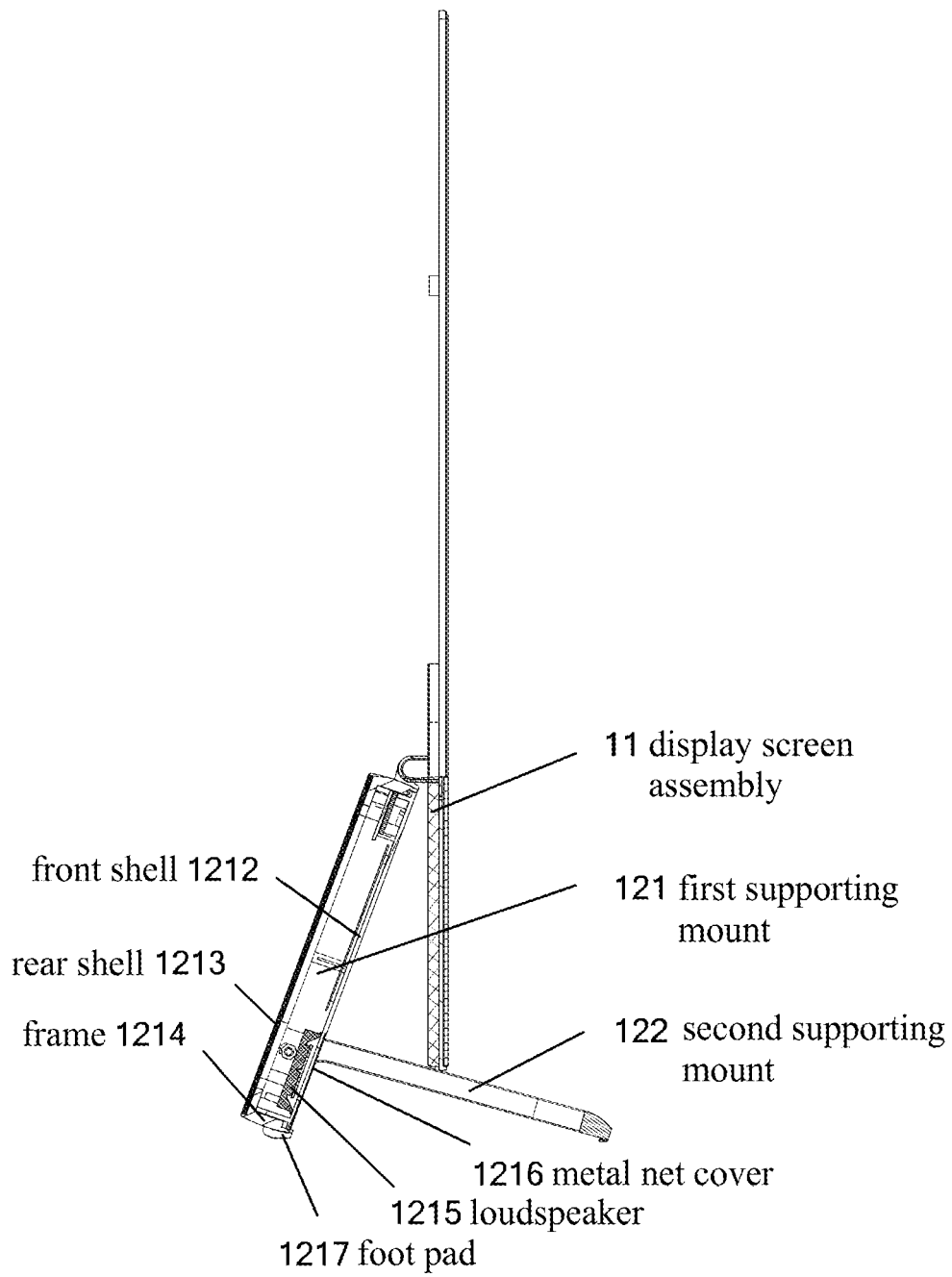
FIG. 4 is a schematic cross-sectional view of a partial structure of the TV set as shown in FIG. 3 according to one embodiment of the present invention.
Figure 5:
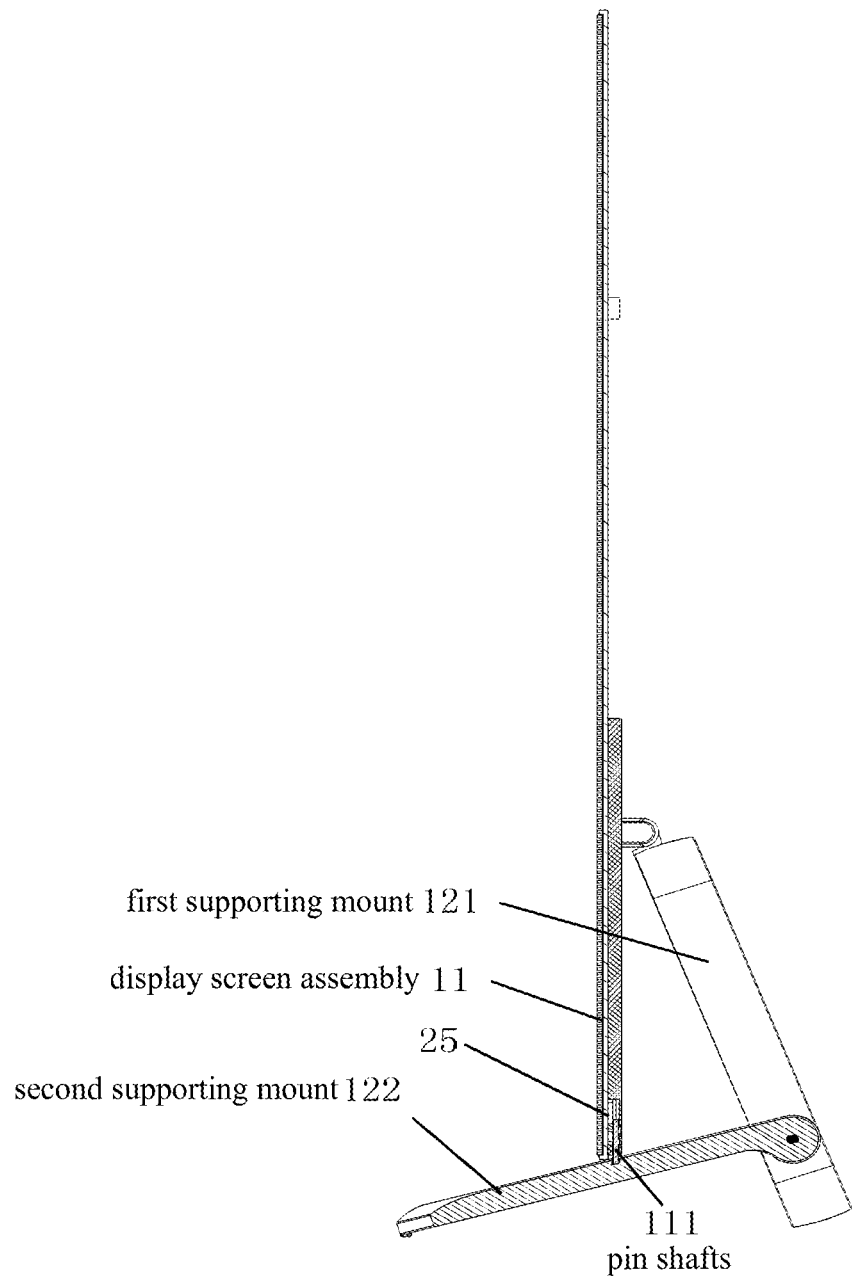
FIG. 5 is a schematic right view of the structure of the TV set as shown in FIG. 1 when the base is in a supporting state according to one embodiment of the present invention.

FIG. 1 is a schematic front view of the structure of a TV set according to one embodiment of the present invention. FIG. 2 is a schematic cross-sectional right view of a partial structure of the TV set as shown in FIG. 1 when a base is in a retracted state according to one embodiment of the present invention. FIG. 3 is a schematic left view of the structure of the TV set as shown in FIG. 1 when the base is in a supporting state according to one embodiment of the present invention. FIG. 4 is a schematic cross-sectional view of a partial structure of the TV set as shown in FIG. 3 according to one embodiment of the present invention. FIG. 5 is a schematic right view of the structure of the TV set as shown in FIG. 1 when the base is in a supporting state according to one embodiment of the present invention. Referring to FIGS. 1-5, the TV set provided in this embodiment includes a display screen assembly 11 and a base 12 disposed at a lower portion of the display screen assembly 11. The base 12 includes a first supporting mount 121 (which functions as a first member) and a second supporting mount 122 (which functions as a second member). A first end of the first supporting mount 121 is rotatably connected with a back side of the display screen assembly 11. The second supporting mount 122 includes two supporting arms symmetrically disposed on two sides of the first supporting mount 121, and a first end (i.e., a connecting end) of each of the two supporting arms is respectively rotatably connected with the two sides of the first supporting mount 121 at a rotatory connection point. In certain embodiments, the supporting arm may have an elongated structure, such as a long cylindrical structure or a rectangular bar structure.

When the base 12 is in a supporting state (as shown in FIG. 3), a first fixed angle is formed between the first supporting mount 121 and the display screen assembly 11, and a second fixed angle is formed between the second supporting mount 122 and the first supporting mount 121. A second end (i.e., a supporting end) of each of the two supporting arms is respectively positioned at a lower front of the display screen assembly 11, and the lower portion of the display screen assembly 11 abuts the two supporting arms. A second end (i.e., a supporting end) of the first supporting mount 121 and the second ends (i.e., the supporting ends) of the two supporting arms are supported on a supporting object, such as a table top. A vertical projection of the display screen assembly 11 onto the table top (i.e., the supporting object) is located between the second end (i.e., the supporting end) of the first supporting mount 121 and the second ends (i.e., the supporting ends) of the two supporting arms. For each of the two supporting arms, a triangular supporting structure is formed by the rotatory connection point rotatably connected with the first supporting mount 121, the second end (i.e., the supporting end) of the first supporting mount 121, and the second end (i.e., the supporting end) of the supporting arm.

When the base 12 is in a retracted state (as shown in FIG. 2), the first supporting mount 121 is attached to the back side of the display screen assembly 11, and the second supporting mount 122 is superimposed on an outer side wall of the first supporting mount 121. In this case, the second supporting mount 122 is substantially parallel to the display screen assembly 11, the first supporting mount 121 is received between the two supporting arms, and the first supporting mount 121 and the second supporting mount 122 form a single layer structure. Further, when the base 12 is in the retracted state (as shown in FIG. 2), a line formed between the first end of the first supporting mount 121 and the second end (i.e., the supporting end) of the first supporting mount 121 is substantially vertical, and is thus substantially parallel to the display screen assembly 11.

In this embodiment, the base 12 is a separate foldable structure. The first end of the first supporting mount 121 is an upper end as shown in FIGS. 1-5. There are various implementations that the first end of the first supporting mount 121 may be rotatably connected with the back side of the display screen assembly 11, e.g., by being hinged through a pin shaft. Further, there are various implementations that a first end of the second supporting mount 122 may be rotatably connected with the first supporting mount 121. When the base 12 is in the supporting state, a second end (the lower end) of the first supporting mount 121 may be supported on the table top (i.e., the supporting object), and a second end of the second supporting mount 122 may be supported on the table top (i.e., the supporting object). A lower end of the display screen assembly 11 may be supported on the two supporting arms of the second supporting mount 122. In this case, the TV set may be supported on the table top (i.e., the supporting object) by the base 12. When the base 12 is in the retracted state, the first supporting mount 121 and the second supporting mount 122 may be superimposed on the back side of the display screen assembly 11, and the TV set may be hung on a wall.

According to the TV set as provided in this embodiment, the first end of the first supporting mount is rotatably connected with the back side of the display screen assembly, and the first ends of the two supporting arms of the second supporting mount are rotatably connected with the two sides of the first supporting mount respectively. When the base is in a supporting state, the first supporting mount and the display screen assembly form a fixed angle, the second supporting mount and the first supporting mount form a fixed angle, a second end of each of the two supporting arms is respectively positioned at a lower front of the display screen assembly, the lower portion of the display screen assembly abuts the two supporting arms, and a second end of the first supporting mount and the second ends of the two supporting arms are supported on a table top (i.e., the supporting object). When the base is in a retracted state, the first supporting mount is attached to the back side of the display screen assembly, and the second supporting mount is superimposed on the outer side of the first supporting mount. Thus, the base may be switchable between the two states for being supported on a table top (i.e., the supporting object) and being hung on a wall without being removed from the TV set. Compared with the conventional technology, adjustment of the base saves time and effort, and the base is not easily damaged, thereby improving the quality of the TV set. Moreover, when the base of the TV set is in the retracted state, the second supporting mount is superimposed on the outer side wall of the first supporting mount, and in the thickness direction of the TV set, a two-layer structure of the display screen assembly and the first supporting mount is formed, thus achieving a thinner structure of the TV set in the hung state when the base is retracted.

Based on the above embodiment, as shown in FIGS. 1-6, in certain embodiments, the second supporting mount 122 may be a U-shaped bracket, and the two supporting arms may be two vertical arms of the U-shaped bracket. A front end of each of the two vertical arms of the U-shaped bracket may be respectively rotatably connected with the two sides of the first supporting mount 121. When the base 12 is in the retracted state, the first supporting mount 121 and the second supporting mount 122 are superimposed, and the first supporting mount 121 is received in the U-shaped bracket. In other words, the first supporting mount 121 is positioned in a frame structure enclosed by the U-shaped bracket.

In the above embodiment, the second supporting mount 122 is formed into a U-shaped bracket, and two ends of the U-shaped bracket are rotatably connected with the first supporting mount 121. The rotatable connecting structure is simple and easy for manufacturing purposes. When the first supporting mount 121 and the second supporting mount 122 are superimposed, the first supporting mount 121 is positioned in a frame structure enclosed by the U-shaped bracket. Thus, after the superimposition, the base 12 of the TV set has a pleasant view and a compact size, and at the front view of the base, no apparent gap can be observed when the first supporting mount 121 and the second supporting mount 122 are superimposed.

In certain embodiments, the second supporting mount 122 may be formed in other shapes. For example, the two supporting arms of the second supporting mount 122 may be two L-shaped arms, and a front end of a vertical arm of each of the two L-shaped arms may be rotatably connected with the first supporting mount 121.

As discussed above, the base 122 may be positioned in two states, and one of the states is a retracted (folded) state. As shown in FIG. 2, the second supporting mount 122 may be a U-shaped bracket, the first supporting mount 121 and the second supporting mount 122 are folded, and the first supporting mount 121 is received in a frame structure enclosed by the U-shaped bracket. After the base 12 is folded, the TV set in this embodiment is in the retracted state, and the TV set forms a two-layer structure of the display screen assembly 11 and the first supporting mount 121 in the thickness direction, thus achieving a thinner structure of the TV set in the hung state when the base is retracted.

The other state of the base 122 is a supporting state. As shown in FIG. 3, the display screen assembly 11 may be vertically supported on the second supporting mount 122. The first supporting mount 121 and the display screen assembly 11 form a fixed angle, a second end of the first supporting mount 121 is supported on a table top (i.e., the supporting object), and a stable triangular supporting structure is formed by the first supporting mount 121, the second supporting mount 122 and the display screen assembly. The second supporting mount 122 and the first supporting mount 121 form a fixed angle, and a stable triangular supporting structure is formed by the first supporting mount 121, the second supporting mount 122 and the table top (i.e., the supporting object).

As shown in FIG. 3, the switching process of the base 12 from the supporting state to the retracted state is described as follows. First, the first supporting mount 121 rotates in a counterclockwise direction to be attached to the back side of the display screen assembly 11. Then, the second supporting mount 122 rotates in a clockwise direction to be folded together with the first supporting mount 121.

Figure 6:
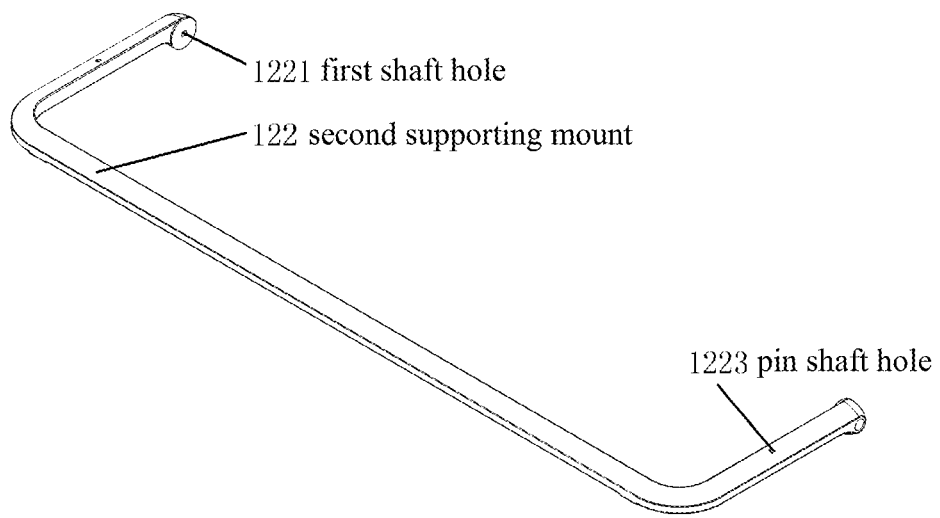
FIG. 6 is a schematic view of the structure of a second supporting mount of the TV set as shown in FIG. 3 according to one embodiment of the present invention.

Further, as shown in FIG. 3, the front ends of the two vertical arms of the U-shaped bracket may be rotatably connected with the two sides of the second end of the first supporting mount 121 through a first rotating shaft 1211. As shown in FIG. 6, a front end of the U-shaped bracket is provided with a first shaft hole 1221, and the first rotating shaft 1211 is fixedly disposed in the first shaft hole 1221. The first supporting mount 121 is provided with a through hole (not shown) corresponding to the first shaft hole, and the first rotating shaft 1211 penetrates the through hole in the first supporting mount 121. The first rotating shaft 1211 is fixedly provided with a first stop washer 13 (as shown in FIG. 8).

Figure 8:
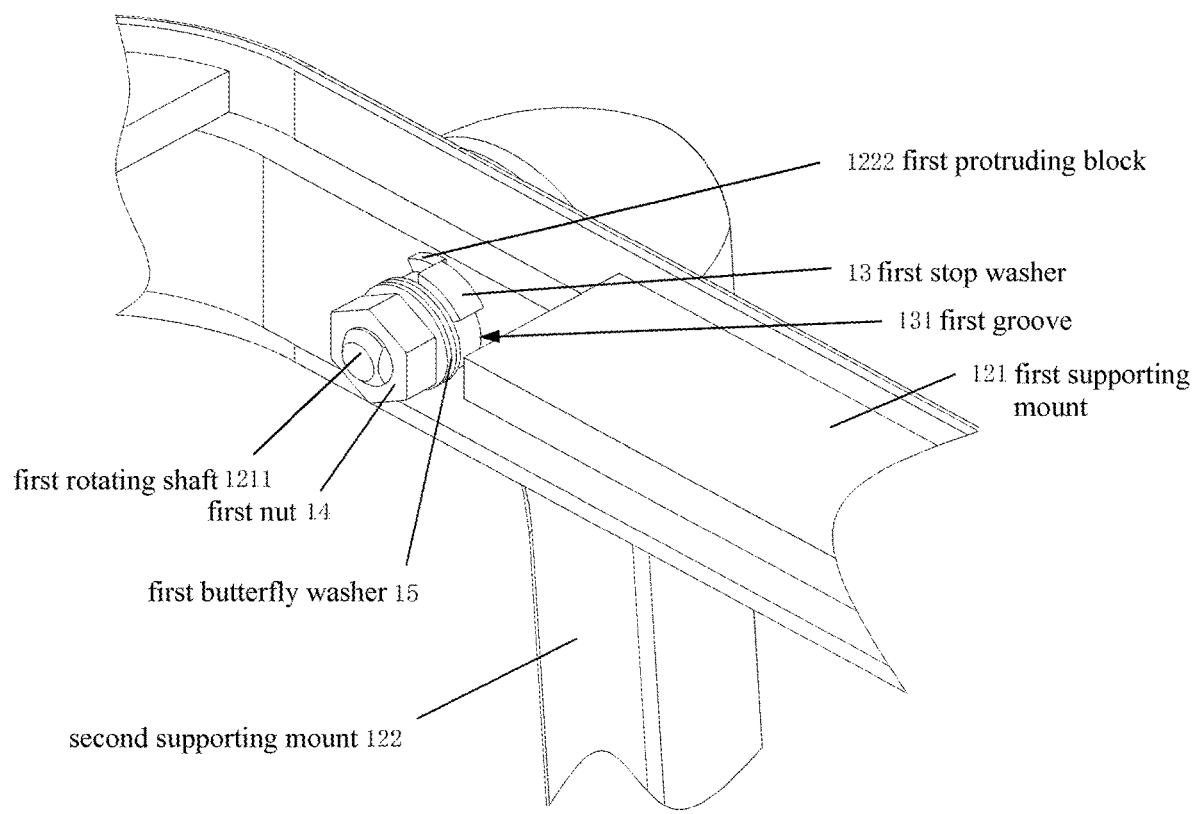
FIG. 8 is a schematic view of a partial structure in which the first supporting mount and the second supporting mount are rotatably connected according to one embodiment of the present invention.
Figure 9:
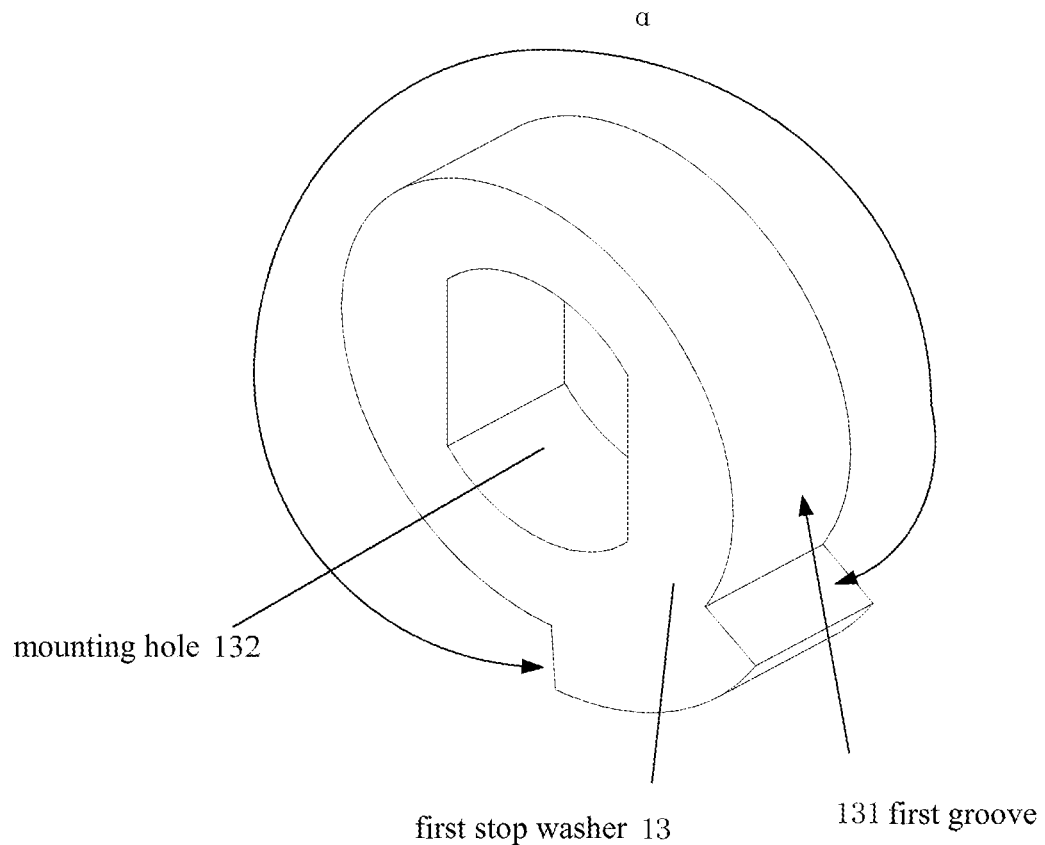
FIG. 9 is a schematic view of the structure of a first stop washer as shown in FIG. 8 according to one embodiment of the present invention.
Figure 10:
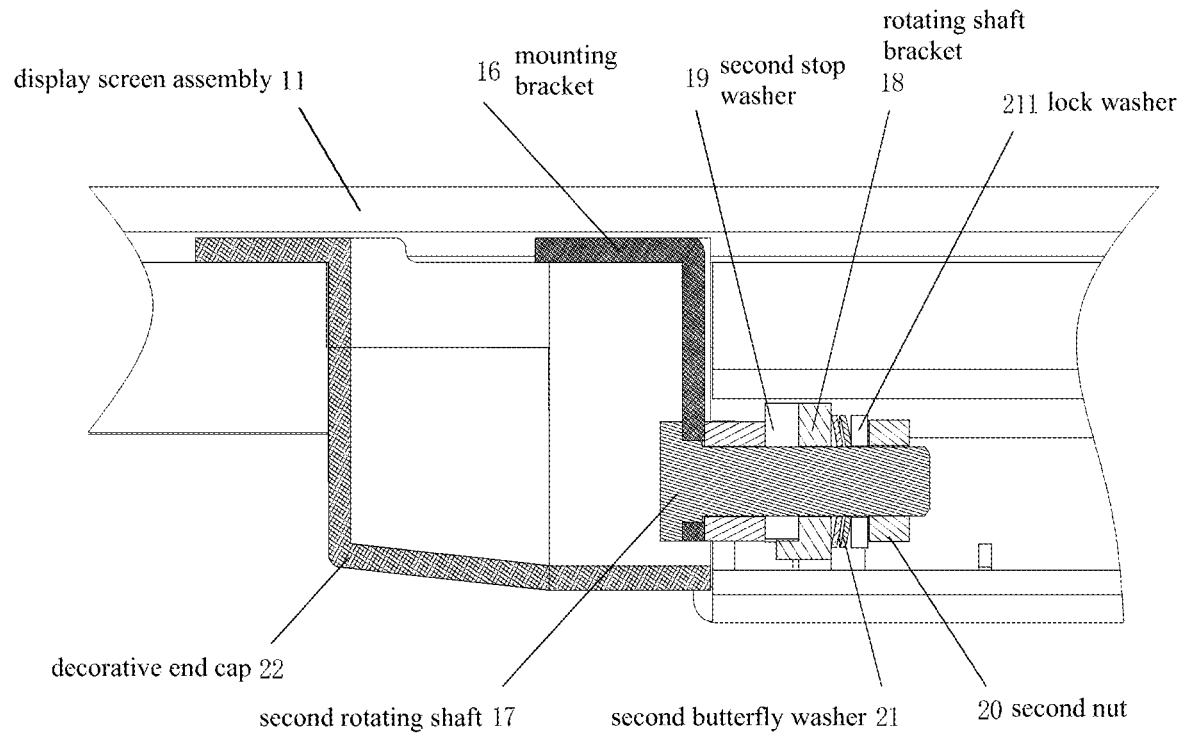
FIG. 10 is a schematic view of a partial structure in which a display screen assembly is rotatably connected with the second supporting mount according to one embodiment of the present invention.
Figure 11:
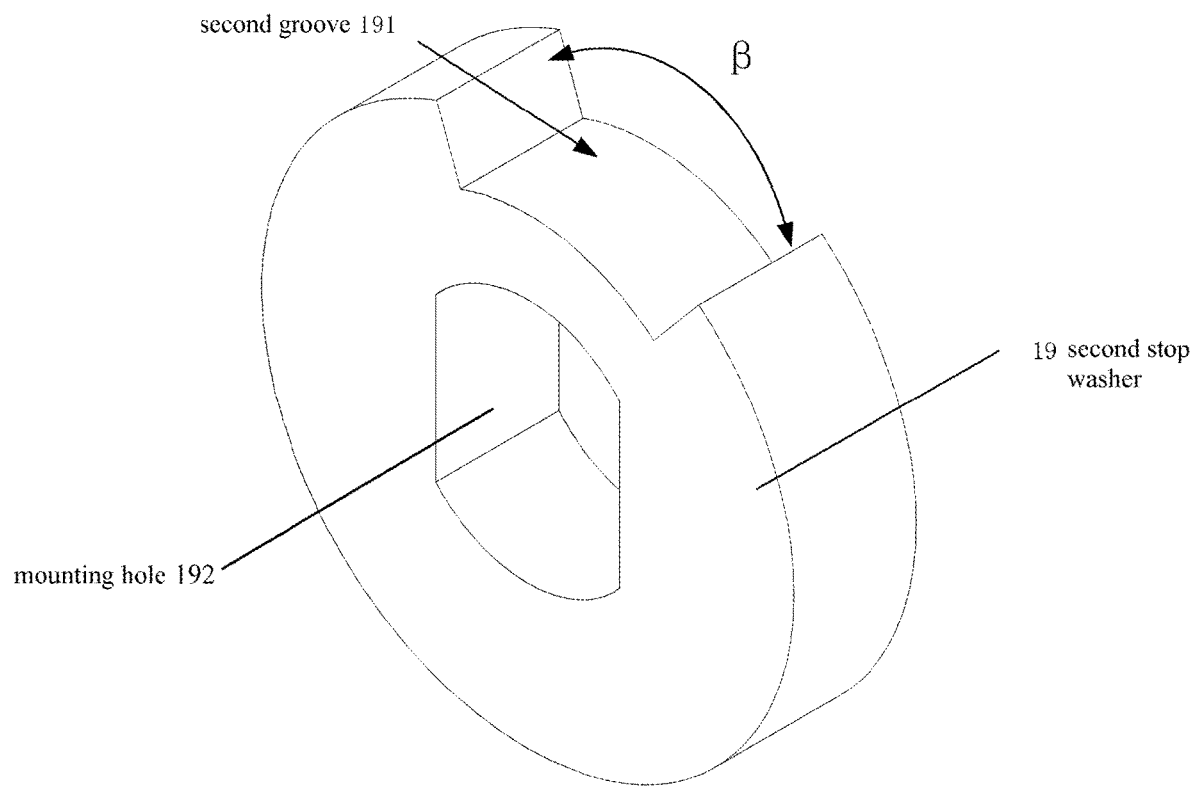
FIG. 11 is a schematic view of the structure of a second stop washer as shown in FIG. 10 according to one embodiment of the present invention.
Figure 12:
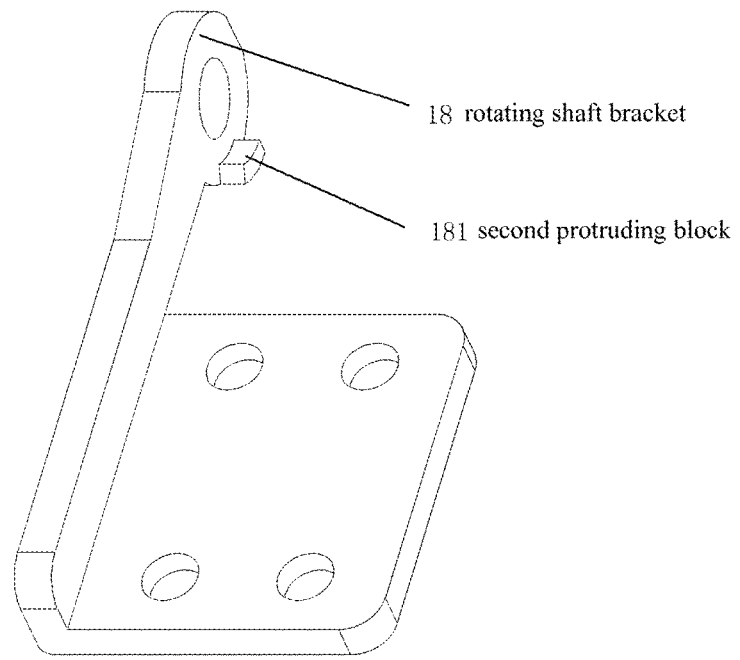
FIG. 12 is a schematic view of the structure of a rotating shaft bracket as shown in FIG. 10 according to one embodiment of the present invention.
Figure 13:
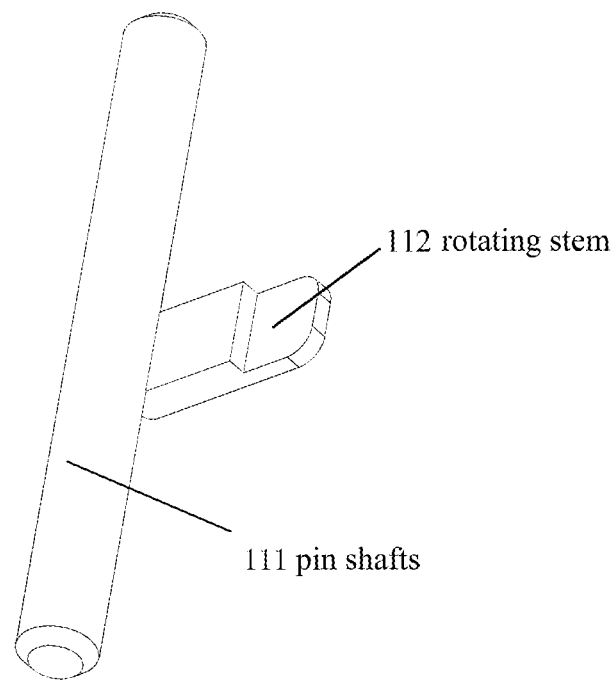
FIG. 13 is a schematic view of the structure of a pin shaft of the TV set as shown in FIG. 3 according to one embodiment of the present invention.
Figure 14:
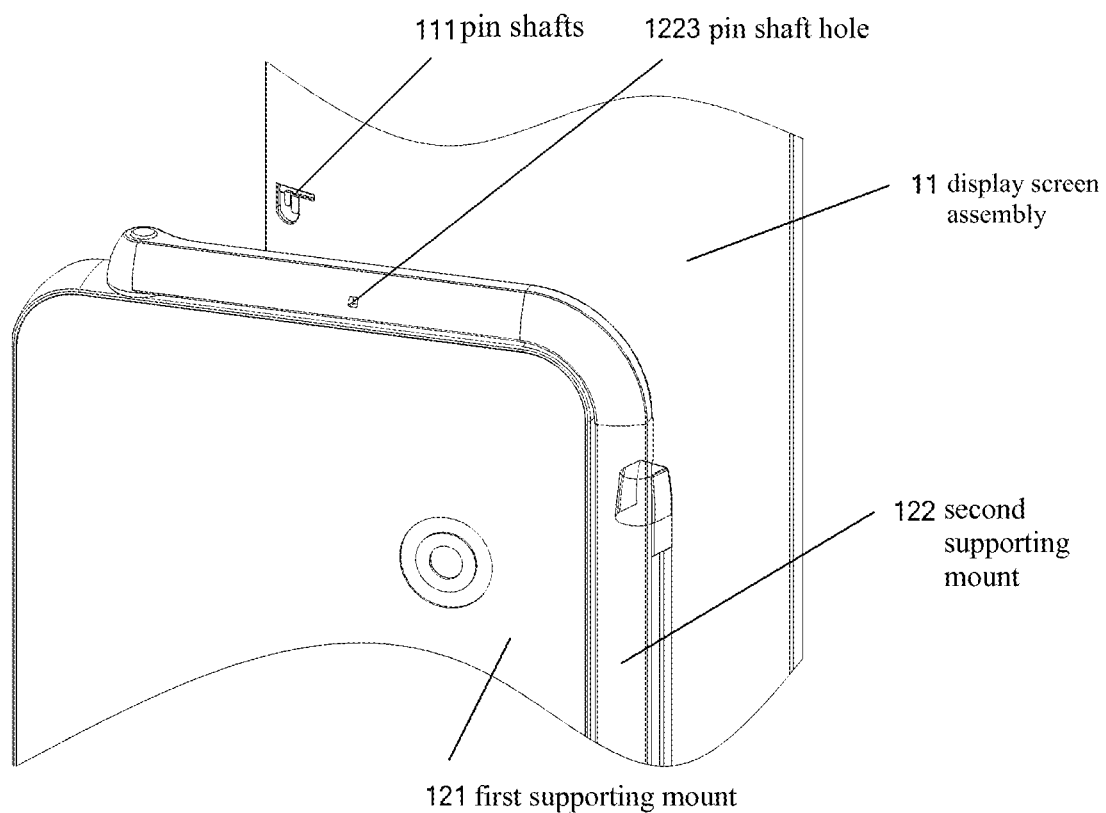
FIG. 14 is a schematic view of a partial structure in which the base is rotatably connected with the display screen assembly according to one embodiment of the present invention.

As shown in FIG. 9, the first stop washer 13 is provided with a first groove 131, and as shown in FIG. 8, the first supporting mount 121 is fixedly provided with a first protruding block 1222 near an outer edge of the through hole. In another embodiment, the first stop washer may be fixedly provided with the first protruding block may be fixedly provided on the first stop washer, and the first groove may be provided on the first supporting mount. The first protruding block fits with the first groove to define a rotation angle of the U-shaped bracket.

Specifically, in certain embodiments, the first rotating shaft 1211 may include a threaded segment and a connecting segment, and a cross-sectional shape of the connecting segment is D-shaped or rectangular. In this embodiment, the connecting segment has a cylindrical structure and is symmetrically provided with two plain surfaces along an axial direction. A cross-sectional shape of the first shaft hole 1221 corresponds to the cross-sectional shape of the connecting segment, and the connecting segment is fixedly disposed in the first shaft hole 1221. The first stop washer 13 has a mounting hole 132 corresponding to the cross-sectional shape of the connecting segment of the first rotating shaft 1211, and the first stop washer 13 is fixedly mounted on the connecting segment. The first protruding block 1222 is embedded in the first groove 131, and the first stop washer 13 and the first rotating shaft 1211 rotate along with the U-shaped bracket, such that the first protruding block 1222 defines a rotation angle of the first stop washer 13, thereby defining the rotation angle of the U-shaped bracket.

The first groove 131 may limit the position of the first protruding block 1222 such that the first protruding block 1222 moves in the first groove 131 according to a particular track. When the first protruding block 1222 moves to an extreme position, the first groove 131 restricts the first protruding block 1222 to ensure that the base 12 stably supports the display screen assembly 11 on the table top (i.e., the supporting object).

In certain embodiments, preferably, the first groove 131 may be a groove (see FIG. 9) circumferentially disposed along the first rotating shaft 1211 with a central angle α of 274°.

Further, in certain embodiments, an outer side of the first stop washer 13 disposed on the first rotating shaft 1211 may be threaded with a first nut 14, and a first butterfly washer 15 is sleeved between the first nut 14 and the first stop washer 13. The first nut 14 and the first rotating shaft 1211 may rotate together, and the first butterfly washer 15 may produce constant damping by means of elastic deformation and may enhance the comfort in operation. However, damping is not required for the structure of the rotating portions. Thus, in one embodiment, the first butterfly washer 15 may be omitted. In another embodiment, the first butterfly washer 15 and the first nut 14 may be sleeved with a lock washer therebetween to prevent the first nut 14 from getting loose during rotation.

In certain embodiment, the central angle α of the first groove 131 disposed along an axis of the first rotating shaft 1211 as described in this embodiment may be designed to have other values, such as 280° or 270°. These variations and embodiments may achieve the objective of the present invention with the purposes thereof not departed from the design idea of the present invention, and they should fall within the protection scope of the invention.

Figure 7:
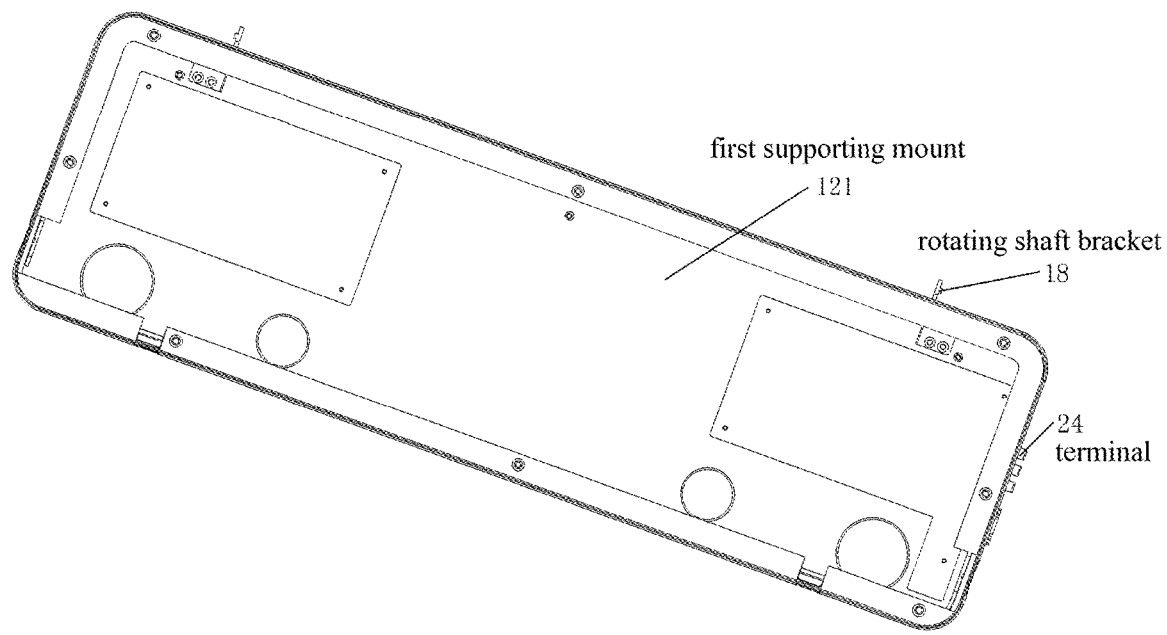
FIG. 7 is a schematic view of the structure of a first supporting mount in the TV set as shown in FIG. 3 according to one embodiment of the present invention.
Figure 15:
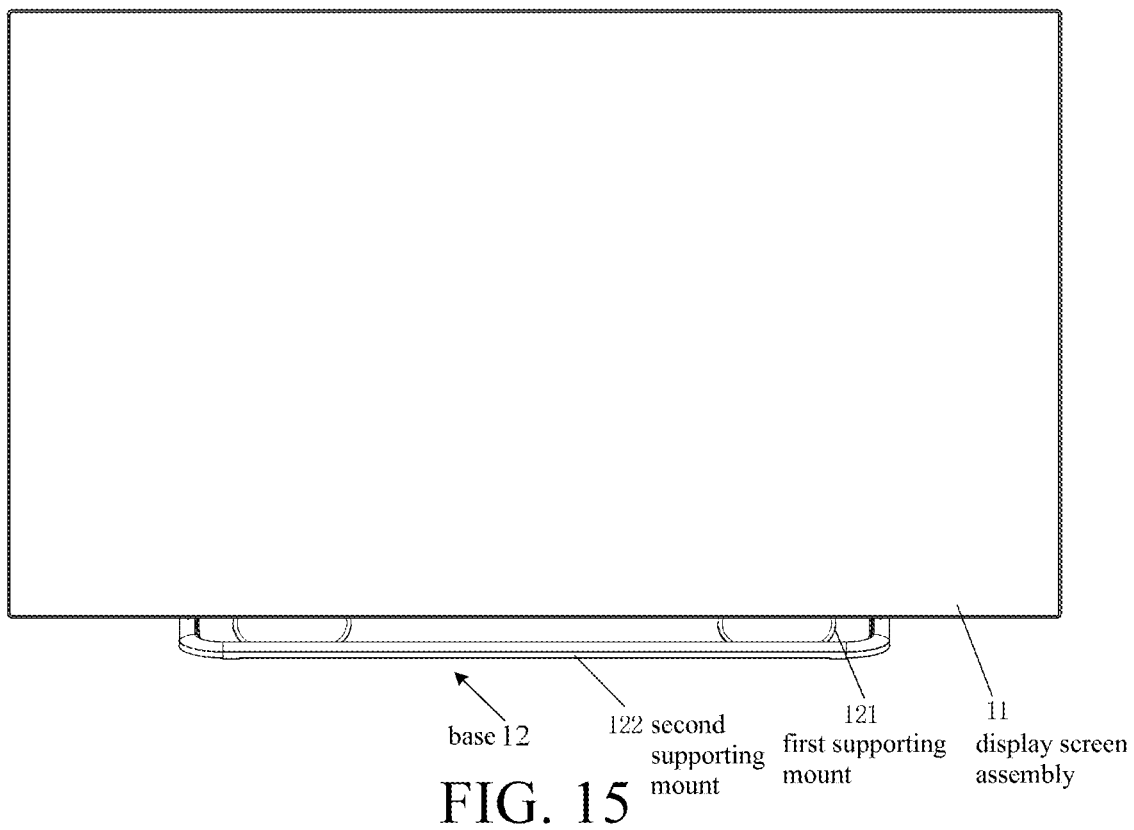
FIG. 15 is a schematic view of the structure of a TV set according to another embodiment of the present invention.

Based on the above embodiment, as shown in FIGS. 7, 10, 11, 12 and 15, in certain embodiments, a mounting bracket 16 may be fixedly provided on the back side of the display screen assembly 11, and a second rotating shaft 17 is fixedly provided on the mounting bracket 16. The first supporting mount 121 is fixedly provided with a rotating shaft bracket 18 sleeved on the second rotating shaft 17. The second rotating shaft 17 is fixedly provided with a second stop washer 19, and the second stop washer 19 is disposed at an outer side of the rotating shaft bracket 18. The second stop washer 19 is provided with a second groove 191, and the rotating shaft bracket 18 is provided with a second protruding block 181. In another embodiment, the second protruding block may be provided on the second stop washer, and the second groove may be provided on the rotating shaft bracket. The rotating shaft bracket 18 rotates along with the first supporting mount 121, and the second protruding block 181 fits with the second groove 191 to define a rotation angle of the first supporting mount 121. FIGS. 7 and 15 respectively illustrate two different structures of the first supporting mount 121.

Specifically, in certain embodiments, the second rotating shaft 17 may include a threaded segment and a connecting segment, and a cross-sectional shape of the connecting segment is D-shaped or rectangular. In this embodiment, the connecting segment has a cylindrical structure and is symmetrically provided with two plain surfaces along an axial direction. A cross-sectional shape of a shaft hole of the mounting bracket 16 corresponds to the cross-sectional shape of the connecting segment, and the connecting segment is fixedly disposed in the shaft hole in the mounting bracket 16. The second stop washer 19 has a mounting hole 192 corresponding to the cross-sectional shape of the connecting segment, and the second stop washer 19 is fixedly mounted on the connecting segment.

The second protruding block 181 is embedded in the second groove 191, and the rotating shaft bracket 18 rotates along with the first supporting mount 121, such that the second protruding block 181 defines a rotation angle of the rotating shaft bracket 18, thereby defining the rotation angle of the first supporting mount 121.

In this embodiment, the mounting bracket 16 is provided on the back side of the display screen assembly 11, the two ends of the mounting bracket 16 in a horizontal direction are each fixedly provided with a second rotating shaft 17, and the distances of the two second rotating shafts 17 to the back side of the display screen assembly 11 are the same such that the two second rotating shafts 17 are disposed linearly, thus ensuring that the base 12 stably supports the display screen assembly 11 on the table top (i.e., the supporting object) when the base is in the supporting state. The rotating shaft bracket 18 is mounted on the first supporting mount 121 at a position corresponding to the second rotating shaft 17, and the rotating shaft bracket 18 is sleeved on the second rotating shaft 17. Therefore, the rotatable connecting structure is simple and easy for manufacturing purposes, and the rotatable connection is reliable. The second groove 191 may limit the position of the second protruding block 181 such that the second protruding block 181 moves in the second groove 191 according to a particular track. When the second protruding block 181 moves to an extreme position, the second groove 191 restricts the second protruding block 181 to ensure that the base 12 stably supports the display screen assembly 11 on the table top (i.e., the supporting object). In certain embodiments, preferably, the second groove 191 is a groove circumferentially disposed along the second rotating shaft 17 with a central angle β of 20°. Further, in certain embodiments, an inner side of the rotating shaft bracket 18 on the second rotating shaft 17 is further provided with a second nut 20, and the second nut 20 is threaded on the connecting segment of the second rotating shaft 17. Further, a second butterfly washer 21 is sleeved between the second nut 20 and the rotating shaft bracket 18, and the mounting bracket 16 at an outer side of the second rotating shaft 17 is provided with a decorative end cap 22.

The second lock nut 20 and the second rotating shaft 17 may rotate together, and the second butterfly washer 21 may produce constant damping by means of elastic deformation and may enhance the comfort in operation. However, damping is not required for the structure of the rotating portions. Thus, in one embodiment, the second butterfly washer 21 may be omitted. In another embodiment, the second butterfly washer 21 and the second nut 20 may be sleeved with a lock washer 211 therebetween to prevent the second nut 20 from getting loose during rotation.

In certain embodiment, the central angle α of the first groove 131 disposed along an axis of the first rotating shaft 1211 as described in this embodiment may be designed to have other values, such as 280° or 270°. These variations and embodiments may achieve the objective of the present invention with the purposes thereof not departed from the design idea of the present invention, and they should fall within the protection scope of the invention.

In certain embodiment, the central angle of the second groove 191 disposed along an axial direction of the second rotating shaft 17 as described in this embodiment may be designed to have other values, such as 25° or 30°. These variations and embodiments may achieve the objective of the present invention with the purposes thereof not departed from the design idea of the present invention, and they should fall within the protection scope of the invention.

Based on the above embodiment, as shown in FIGS. 5, 6, 13 and 14, in certain embodiments, each of the two vertical arms of the U-shaped bracket is respectively provided with a pin shaft hole 1223, and the lower portion of the display screen assembly 11 is provided with pin shafts 111. When the lower portion of the display screen assembly 11 is supported on the U-shaped bracket, each of the pin shafts 111 is respectively inserted into the corresponding pin shaft hole 1223. In certain embodiments, each of the pin shafts 111 is provided with a rotating stem 112, and the display screen assembly 11 is further provided with a magnet (not shown). When the pin shaft 111 is pulled out from the corresponding pin shaft hole 1223, the magnet attracts the rotating stem 112. In this embodiment, the limiting structure of the pin shaft 111 and the pin shaft hole 1223 may be used to increase the stability for supporting the TV set. When the base 12 is unfolded to switch to the supporting state, each of the pin shafts 111 may be rotated by 90° and inserted in the corresponding pin shaft hole 1223 in the U-shaped bracket so as to be limited therein. When the TV set is hung on a wall, each of the pin shafts 111 may be rotated by 90° in a reversed direction, and the magnet mounted on the display screen assembly 11 may attract the pin shafts 111 such that the pin shafts 111 are be exposed from the TV set. In certain embodiments, a spring may be used to replace the magnet. When a spring is used, each of the pin shafts 111 extends and is inserted into the corresponding pin shaft hole 1223 under the tension of the spring. When the TV set is hung, the pin shafts 111 retract and respectively rotate by 90° under a thrust such that the rotating stem 112 is retained at the back side of the display screen assembly 11.

In this embodiment, the display screen assembly 11 is fixed through the pin shaft 111 and the pin shaft hole 1223. Thus, the first stop washer 13 and the first protruding block 1222 in the above embodiment can be omitted, and the rotation amplitude of the second supporting mount 122 may be unrestricted. When the base is in the supporting state, the display screen assembly 11 can be reliably and stably fixed on the table top (i.e., the supporting object) as long as the pin shafts 111 on the display screen assembly 11 are fixed in the corresponding pin shaft holes 1223 on the U-shaped bracket.

Further, based on the above embodiment, as shown in FIGS. 2-4, in certain embodiments, the TV set may further include a speaker assembly disposed on the first supporting mount 121. The speaker assembly may generate sound towards a front side of the TV set. Specifically, the speaker assembly may be disposed at a position near the lower portion of the first supporting mount 121. When the base is in the retracted state, the lower portion of the first supporting mount 121 extends beyond a lower edge of the display screen assembly 11, and a loudspeaker 1215 of the speaker assembly faces towards a front side of the display screen assembly 11.

When the base is in the supporting state, the loudspeaker 1215 of the speaker assembly faces towards the front side of the display screen assembly 11, and sound waves generated by the loudspeaker 1215 are transmitted toward the front of the display screen assembly 11 through a gap between the display screen assembly 11 and the table top (i.e., the supporting object). In certain embodiments, the TV set may further include a circuit module and a terminal 24. The circuit module and the terminal 24 are both disposed on the first supporting mount 121, and the circuit module is electrically connected with the display screen assembly 11.

Referring to FIG. 2, when the TV set is in the hung state, the loudspeaker 1215 is disposed in the first supporting mount 121, and a sound outlet of the loudspeaker 1215 extends to a position below the display screen assembly 11. Thus, the loudspeaker 1215 generates sound directly forwards, and the sound waves travel directly towards a viewer position in front of the display screen assembly 11, thus reducing attenuation of the sound pressure.

When the TV set is supported by the bracket, further referring to FIG. 3, the second supporting mount 122 is connected with the first supporting mount 121 through the first rotating shaft 1211 disposed on the first supporting mount 121. Thus, a triangular structure is formed by the first rotating shaft 1211, a supporting point between the first supporting mount and the table top (i.e., the supporting object), and a supporting point between the second supporting mount and the table top (i.e., the supporting object). The display screen assembly is maintained in a vertical state by inserting the pin shafts 111 into the corresponding pin holes 1223 of the second supporting mount 122, such that the display screen assembly 11 is suspended above and away from the table top (i.e., the supporting object). In this way, the loudspeaker 1215 may also generate sound directly forwards, and the sound waves travel directly toward the viewer position through a gap between the table top (i.e., the supporting object) and the display screen suspended thereabove, thereby improving the sound effects.

In certain embodiments, preferably, as shown in FIG. 4, the lower portion of the first supporting mount 121 may be provided with a foot pad 1217. The foot pad 1217 may be movably retracted into the first supporting mount 121 by the tension of a spring. When the second bracket 122 is rotated to a support angle, the second supporting mount 122 is provided with a protruding block, and the foot pad 1217 extends out of the first supporting mount 121 under a thrust of the protruding block.

By providing the foot pad 1217 at the lower portion of the first supporting mount 121, the foot pad 1217 may be prevented from directly contacting with the table top (i.e., the supporting object) and scratching the table top (e.g., a TV cabinet table top). Further, the TV set may be more stably supported on the table top (i.e., the supporting object).

In the TV set provided in this embodiment, the speaker assembly, the circuit module and the terminal 24 are removed from the inside of the display screen assembly and are mounted on the base, thereby further reducing the thickness of the display screen assembly 11. Moreover, the speaker assembly may be designed in a manner of generating sound towards the front side after being mounted on the base. Thus, better mid-range and treble sounds may be received directly in front of the TV set, which avoids dry sounds and ensures better sound effects.

It should be noted that the speaker assembly may perform signal transmission with the TV set by a wired connection or a wireless connection.

Further, as shown in FIGS. 2 and 4, the first supporting mount 121 may include a front shell 1212, a rear shell 1213 and a frame 1214. The front shell 1212 and the rear shell 1213 are mounted on the frame 1214, and the loudspeaker 1215 in the speaker assembly is mounted at an inner side of the front shell 1212 and faces towards a front side of the TV set. The front shell 1212, the rear shell 1213 and the frame 1214 may serve as a casing of the speaker assembly, and the design of the casing of the speaker assembly is not needed. In certain embodiments, the circuit module and the terminal 24 may also be mounted on the inner side of the front shell 1212.

As shown in FIG. 4, preferably, the speaker assembly may further include a metal net cover 1216 disposed on an outer side of the front shell 1212. The metal net cover 1216 can prevent the dust in the air from entering the speaker assembly, and thus prolonging the service life of the speaker assembly. The loudspeaker 1215 may be rotatably mounted on the first supporting mount 121 (not shown), such that the loudspeaker 1215 generates sound towards the front side of the TV set.

In this embodiment, the loudspeaker 1215 is rotatably mounted on the first supporting mount 121, and through adjustment on the angle of the loudspeaker 1215, the loudspeaker keeps generating sound towards the front side. Thus, better mid-range and treble sounds may be received directly in front of the TV set, which avoids dry sounds and ensures better sound effects.

Figure 16:
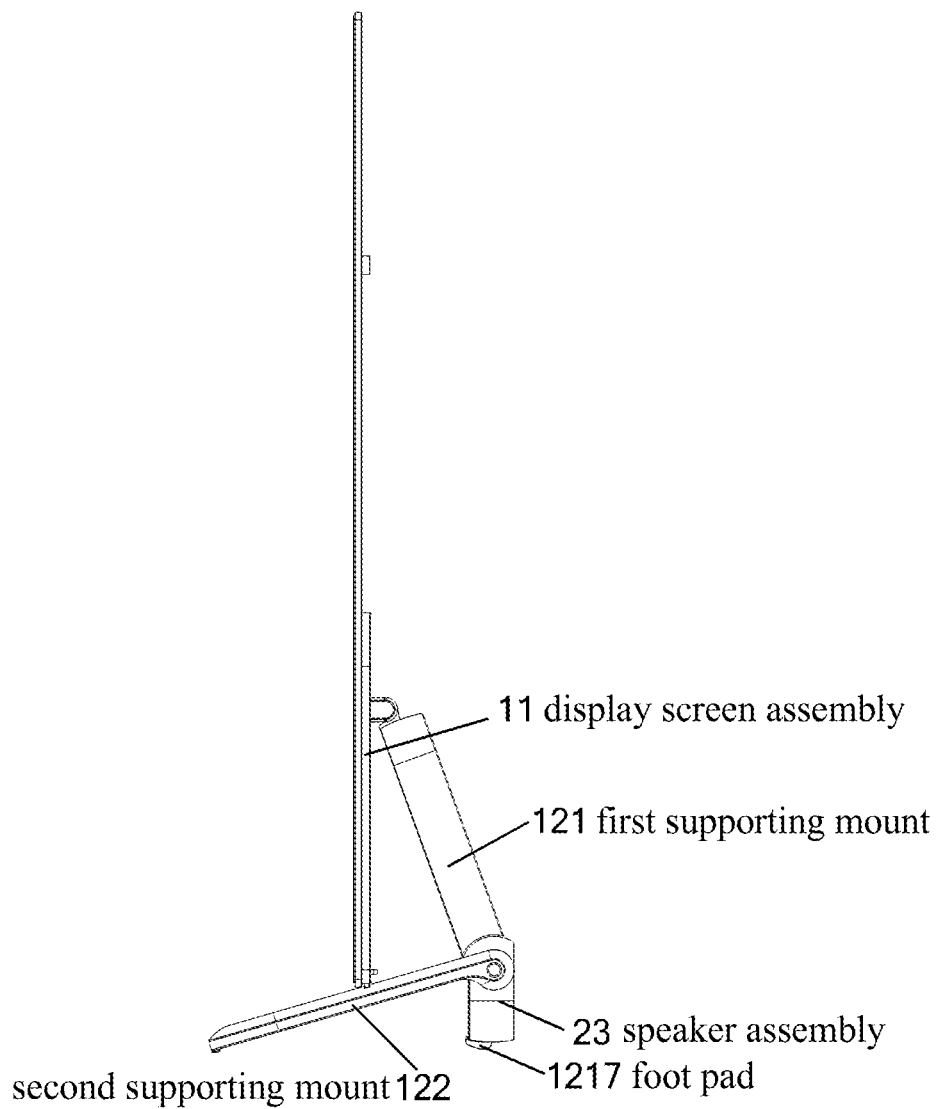
FIG. 16 is a schematic view of the structure of a TV set according to a further embodiment of the present invention.

FIG. 16 is a schematic view of the structure of a TV set according to a further embodiment of the present invention. In this embodiment as shown in FIG. 16, the structure of the TV set is similar to the structure as described in the above embodiments, and the main difference lies in that the speaker assembly 23 is rotatably mounted at the lower portion of the first supporting mount 121 such that the speaker assembly 23 generates sound towards the front side of the TV set, and the first supporting mount 121 is supported on the table top (i.e., the supporting object) through the speaker assembly 23. The structure of the portion where the speaker assembly 23 and the first supporting mount 121 are rotatably connected may be achieved through a minute change of the structure of the rotating shaft as described in the first embodiment as well as implemented in other manners, and is therefore not repeated herein.

The TV set as provided in this embodiment can achieve all the beneficial effects of the first embodiment, which is not repeated herein.

In the present invention, the terms "first" and "second" are only for the purpose of description, and should not be construed as indicating or implying relative importance; unless otherwise clearly defined and limited, the terms such as "mount", "connect" and "fix" should be understood in a broad sense, for example, the term "connect" may refer to a fixed connection, a detachable connection, or an integral connection. Persons of ordinary skill in the art can understand the specific meanings of the above terms in the present invention according to specific circumstances.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. ATV set, comprising:
   (a) a display screen assembly; and
   (b) a base disposed at a lower portion of the display screen assembly, the base comprising at least one first member and a second member, wherein:
   the at least one first member comprises a first end and a supporting end, wherein the first end of the at least one first member is rotatably connected with a back side of the display screen assembly;
   the second member comprises a connecting end and a supporting end, wherein the connecting end of the second member is rotatably connected with the at least one first member at a rotary connection point away from the first end of the at least one first member;
   when the base is in a supporting state, a first fixed angle is formed between the at least one first member and the display screen assembly, a second fixed angle is formed between the at least one first member and the second member at the rotatory connection point, the supporting end of the at least one first member is configured to be positioned at a lower back of the display screen assembly on a supporting object, and the supporting end of the second member is configured to be positioned at a lower front of the display screen assembly on the supporting object, such that a triangular supporting structure is formed by the rotatory connection point rotatably connected with the at least one first member, the supporting end of the at least one first member, and the supporting end of the second member, and a vertical projection of the display screen assembly onto a plane defined by the supporting end of the at least one first member and the supporting end of the second member is located between the supporting end of the at least one first member and the supporting end of the second member; and
   when the base is in a retracted state, the at least one first member moves to a position substantially close to the back side of the display screen assembly, and the second member is substantially parallel to the display screen assembly.

2. The TV set according to claim 1, wherein when the base is in the retracted state, a line formed between the first end of the at least one first member and the supporting end of the at least one first member is substantially parallel to the display screen assembly.

3. The TV set according to claim 1, further comprising a speaker assembly disposed on the base, wherein the speaker assembly is configured to generate sound towards a front side of the TV set.

4. The TV set according to claim 3, wherein the speaker assembly is disposed on the at least one first member.

5. The TV set according to claim 1, wherein a first limiting mechanism is provided at the connecting end of the second member, such that when the base is in the supporting state, the first limiting mechanism locks the second member relatively to the at least one first member to form the second fixed angle between the at least one first member and the second member at the rotatory connection point.

6. The TV set according to claim 5, wherein the first limiting mechanism comprises a first rotating shaft, wherein the connecting end of the second member is rotatably connected with the at least one first member at the rotatory connection point through the first rotating shaft.

7. The TV set according to claim 6, wherein the connecting end of the second member is provided with a first shaft hole, and the first rotating shaft is fixedly disposed in the first shaft hole; and
wherein the at least one first member is provided with a through hole corresponding to the first shaft hole, and the first rotating shaft penetrates the through hole of the at least one first member.

8. The TV set according to claim 7, wherein:
the first rotating shaft is fixedly provided with a first stop washer; and
a first groove is provided on one of the first stop washer and the at least one first member, and a first protruding block is fixedly provided on the other of the first stop washer and the at least one first member near an outer edge of the through hole, and the first groove fits with the first protruding block to define a rotation angle of the second member.

9. The TV set according to claim 8, wherein the first rotating shaft comprises a threaded segment and a connecting segment, and a cross-sectional shape of the connecting segment is D-shaped or rectangular;
wherein a cross-sectional shape of the first shaft hole corresponds to the cross-sectional shape of the connecting segment, and the connecting segment is fixedly disposed in the first shaft hole;
wherein the first stop washer has a mounting hole corresponding to the cross-sectional shape of the connecting segment, and the first stop washer is fixedly mounted on the connecting segment; and
wherein the first protruding block is embedded in the first groove, and the first stop washer and the first rotating shaft rotate along with the second member, such that the first protruding block defines a rotation angle of the first stop washer, thereby defining the rotation angle of the second member.

10. The TV set according to claim 9, wherein the threaded segment is threaded with a first nut.

11. The TV set according to claim 10, wherein a first butterfly washer is sleeved between the first nut and the first stop washer.

12. The TV set according to claim 1, wherein a second limiting mechanism is provided at the first end of the at least one first member, such that when the base is in the supporting state, the second limiting mechanism locks the at least one first member relatively to the display screen assembly to form the first fixed angle between the at least one first member and the display screen assembly.

13. The TV set according to claim 12, wherein the second limiting mechanism comprises:
a mounting bracket fixedly provided at the back side of the display screen assembly; and
a second rotating shaft is fixedly provided on the mounting bracket, wherein:
the at least one first member is fixedly provided with a rotating shaft bracket sleeved on the second rotating shaft;
the second rotating shaft is fixedly provided with a second stop washer, and the second stop washer is disposed at an outer side of the rotating shaft bracket;
a second groove is provided on one of the second stop washer and the rotating shaft bracket, and a second protruding block is provided on the other of the second stop washer and the rotating shaft bracket; and
the rotating shaft bracket rotates along with the at least one first member, and the second protruding block fits with the second groove to define a rotation angle of the at least one first member.

14. The TV set according to claim 13, wherein the second rotating shaft comprises a threaded segment and a connecting segment, and a cross-sectional shape of the connecting segment is D-shaped or rectangular;
wherein a cross-sectional shape of a shaft hole of the mounting bracket corresponds to the cross-sectional shape of the connecting segment, and the connecting segment is fixedly disposed in the shaft hole of the mounting bracket;
wherein the second stop washer has a mounting hole corresponding to the cross-sectional shape of the connecting segment, and the second stop washer is fixedly mounted on the connecting segment; and
wherein the second protruding block is embedded in the second groove, the rotating shaft bracket rotates along with the first member, such that the second protruding block defines a rotation angle of the rotating shaft bracket, thereby defining the rotation angle of the at least one first member.

15. The TV set according to claim 14, wherein the threaded segment is threaded with a second nut.

16. The TV set according to claim 15, wherein a second butterfly washer and a lock washer are sleeved between the second nut and the rotating shaft bracket.

* * * * *